United States Patent
Berndt et al.

(10) Patent No.: US 11,738,621 B2
(45) Date of Patent: Aug. 29, 2023

(54) VENTILATING TUBE AND AN AIR CONDITIONING SYSTEM FOR A VEHICLE

(71) Applicant: Mahle International GmbH, Stuttgart (DE)

(72) Inventors: Ralf Berndt, Ditzingen-Schockingen (DE); Norman Schaake, Markgroeningen (DE)

(73) Assignee: MAHLE INTERNATIONAL GMBH

(*) Notice: Subject to any disclaimer, the term of this patent is extended or adjusted under 35 U.S.C. 154(b) by 843 days.

(21) Appl. No.: 16/579,041

(22) Filed: Sep. 23, 2019

(65) Prior Publication Data

US 2020/0094649 A1 Mar. 26, 2020

(30) Foreign Application Priority Data

Sep. 24, 2018 (DE) .......................... 102018216215.8

(51) Int. Cl.
  *B60H 1/00* (2006.01)
(52) U.S. Cl.
  CPC ... *B60H 1/00564* (2013.01); *B60H 2001/006* (2013.01)
(58) Field of Classification Search
  CPC .................. B60H 1/00564; B60H 2001/006
  USPC ....................................................... 181/224
  See application file for complete search history.

(56) References Cited

U.S. PATENT DOCUMENTS

| | | | | |
|---|---|---|---|---|
| 1,929,595 A | * | 10/1933 | Macleod | ............... E06B 7/084 49/54 |
| 3,113,634 A | * | 12/1963 | Watters | ............... F16L 55/0336 428/116 |
| 4,106,587 A | * | 8/1978 | Nash | ...................... F02K 1/827 181/290 |
| 6,116,375 A | * | 9/2000 | Lorch | .................. G10K 11/172 181/224 |
| 6,450,289 B1 | * | 9/2002 | Field | ..................... G10K 11/172 181/295 |
| 6,607,432 B2 | * | 8/2003 | Schaake | ................ F16L 55/033 454/143 |
| 8,342,922 B2 | * | 1/2013 | Deneau | .............. B60H 1/00849 454/906 |
| 8,641,494 B2 | * | 2/2014 | Matthews | ............ G10K 11/161 454/262 |
| 2013/0327584 A1 | | 12/2013 | Trumler et al. | |

FOREIGN PATENT DOCUMENTS

| | | |
|---|---|---|
| DE | 102010049578 A1 | 4/2012 |
| DE | 102011008518 A1 | 7/2012 |
| DE | 102017002857 A1 | 9/2018 |
| KR | 2005106296 A * | 11/2005 |

OTHER PUBLICATIONS

English abstract for DE-102011008518.
English abstract for DE-102017002857.

* cited by examiner

*Primary Examiner* — Allen R. B. Schult
(74) *Attorney, Agent, or Firm* — Fishman Stewart PLLC

(57) ABSTRACT

A ventilating tube may include a body through which air is flowable in an air flow direction and a sound attenuating mechanism for attenuating airborne noise. The sound attenuating mechanism may be a wavelength resonator, which may include at least one resonance chamber. On one side, the at least one resonance chamber may have an opening which opens the at least one resonance chamber into the body transversely to the air flow direction.

17 Claims, 2 Drawing Sheets

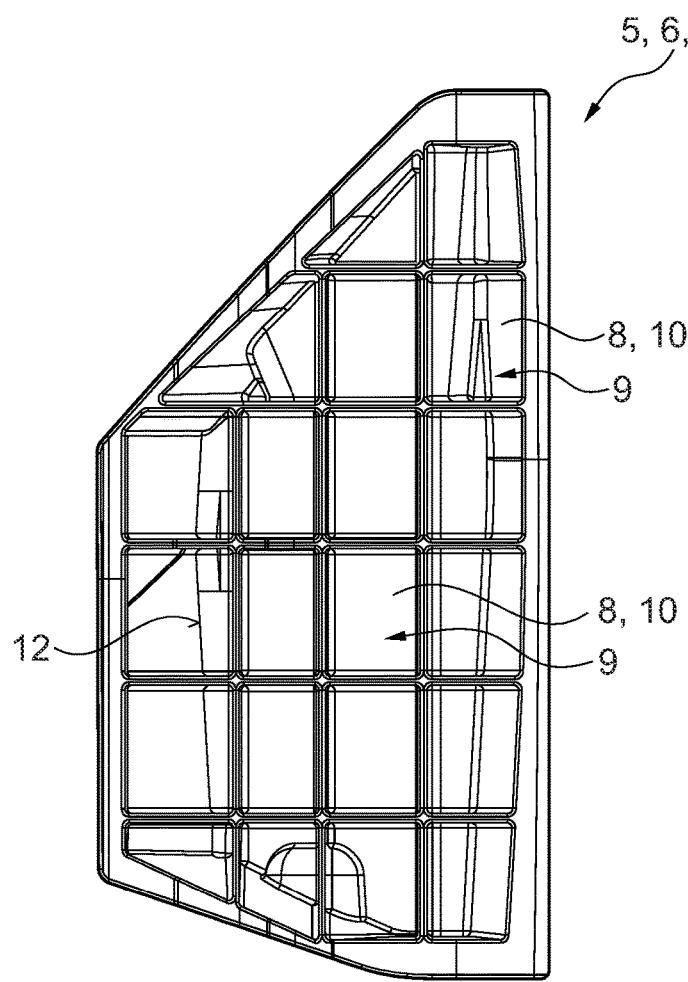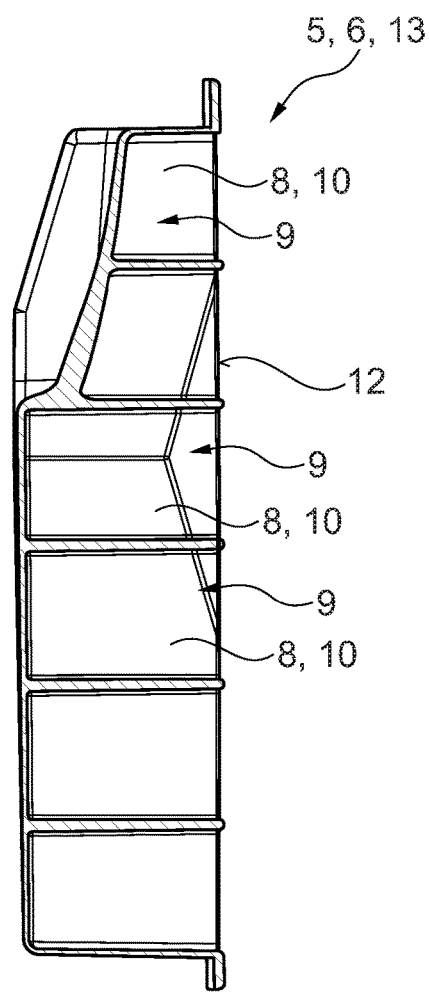
Fig. 3    Fig. 4
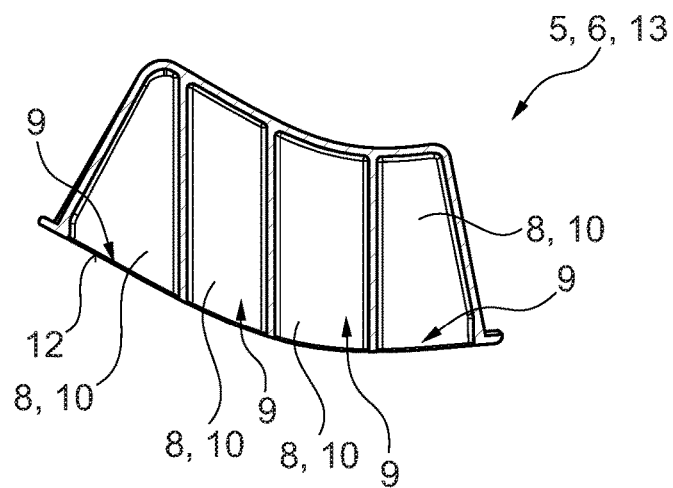
Fig. 5

VENTILATING TUBE AND AN AIR CONDITIONING SYSTEM FOR A VEHICLE

CROSS-REFERENCE TO RELATED APPLICATIONS

This application claims priority to German Patent Application No. DE 10 2018 216 215.8, filed on Sep. 24, 2018, the contents of which are hereby incorporated by reference in its entirety.

TECHNICAL FIELD

The invention relates to a ventilating tube, in particular a diffusor for an air conditioning system of a motor vehicle. The invention also relates to an air conditioning system for a vehicle comprising the ventilating tube.

BACKGROUND

In the case of an air conditioning system comprising a suction filter, the noise generated by a fan—in particular its high-frequency components—reaches into the passenger compartment in a virtually unattenuated manner through the air conditioning system. To attenuate this noise, sound attenuating devices are currently used in motor vehicles. These can be, for example, expansion chambers comprising a double cross sectional jump, which effect a sound scattering and interference. For the interference-free and low-noise guidance of the air, they are covered with a non-woven fabric beyond the cross sectional jump, as is described, for example, in DE 10 2011 008 518 A1. The covering of the expansion chamber with non-woven fabric disadvantageously leads to additional material and assembly costs.

SUMMARY

It is thus the object of the invention to specify an improved or at least alternative embodiment for a ventilating tube of the generic type, in the case of which the described disadvantages are overcome. It is also a further object of the invention to provide a corresponding air conditioning system.

According to the invention, these objects are solved by means of the subject matter of the independent claim(s). Advantageous embodiments are the subject matter of the dependent claim(s).

Air can flow through a ventilating tube in the air flow direction and it is in particular a diffusor for an air conditioning system of a motor vehicle. The ventilating tube thereby has a sound attenuating device for attenuating airborne sound. According to the invention, the sound attenuating device is a wavelength resonator comprising at least one resonance chamber. On one side, the at least one resonance chamber has an opening, which opens the resonance chamber transversely to the air flow direction into the ventilating tube. As compared with a conventional expansion chamber comprising a cover, material as well as assembly costs can be saved in the ventilating tube according to the invention. The costs per piece for the ventilating tube can thus also be reduced. As compared with a conventional expansion chamber comprising a cover, the attenuating effect can additionally at least be maintained or even improved in the ventilating tube according to the invention.

It can advantageously be provided that the wavelength resonator is a $\lambda/4$ resonator and/or that the respective at least one resonance chamber of the wavelength resonator is a $\lambda/4$ resonator. As compared with a conventional expansion chamber comprising a cover, the $\lambda/4$ resonator has a significantly small opening, so that no significant flow interference or noise generation takes place in the wavelength resonator. As compared with a conventional expansion chamber comprising a cover, the latter can analogously be forgone. The acoustic attenuating effect of the $\lambda/4$ resonator—adapted to the same wavelength—tends to be better in the case of an identical active surface and in the case of an identical volume than in the case of a conventional expansion chamber comprising a cover.

In the case of a further development of the ventilating tube, it is provided that the at least one resonance chamber is cube-shaped and the opening is embodied by means of an open side surface of the cube-shaped resonance chamber. It is also conceivable that a cross section of the at least one resonance chamber in the air flow direction corresponds to a cross section of its opening at least in a chamber section adjacent to the respective opening.

It can advantageously be provided that the wavelength resonator is embodied as a separate insert. The insert is then inserted into a receiving opening, which is embodied in a wall of the ventilating tube. The wavelength resonator can thus for example also be installed in the ventilating tube as a retrofit solution. The wavelength resonator can alternatively be integrally molded on and/or in a wall of the ventilating tube. Material and assembly costs can advantageously be reduced thereby.

In the case of a preferred embodiment of the ventilating tube, it is provided that the wavelength resonator has a plurality of resonance chambers arranged next to one another. The openings of the respective plurality of resonance chambers then open the latter transversely to the air flow direction into the ventilating tube. The plurality of resonance chambers can be arranged next to one another, for example in a plurality of rows and a plurality of columns, in the wavelength resonator, and the ventilating tube can thus be designed in a more compact manner. The plurality of resonance chambers of the wavelength resonator can advantageously have shapes, which differ from one another, and/or volumes, which differ from one another, and/or depths, which differ from one another, for differently coordinating resonance frequencies, and/or cross sections, which differ from one another, of the openings. The attenuating effect can thus be attained in a broader wavelength range.

The openings of the plurality of resonance chambers can advantageously form a joint opening area, which is aligned in the air flow direction. A wall of the ventilating tube laterally adjacent to the wavelength resonator and the opening area of the wavelength resonator can additionally be located in a joint plane and can transition into one another in a flush manner. An unwanted noise development can thus be avoided in the ventilating tube.

The invention also relates to an air conditioning system for a vehicle comprising at least one ventilating tube, through which air can flow in the air flow direction, and which is designed as described above. The ventilating tube is preferably a diffusor of the air conditioning system.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically

FIG. 3 shows a view of the wavelength resonator shown in FIG. 1 and FIG. 2;

FIGS. 4 and 5 show sectional views of the wavelength resonator shown in FIG. 3.

DETAILED DESCRIPTION

Figure 1:
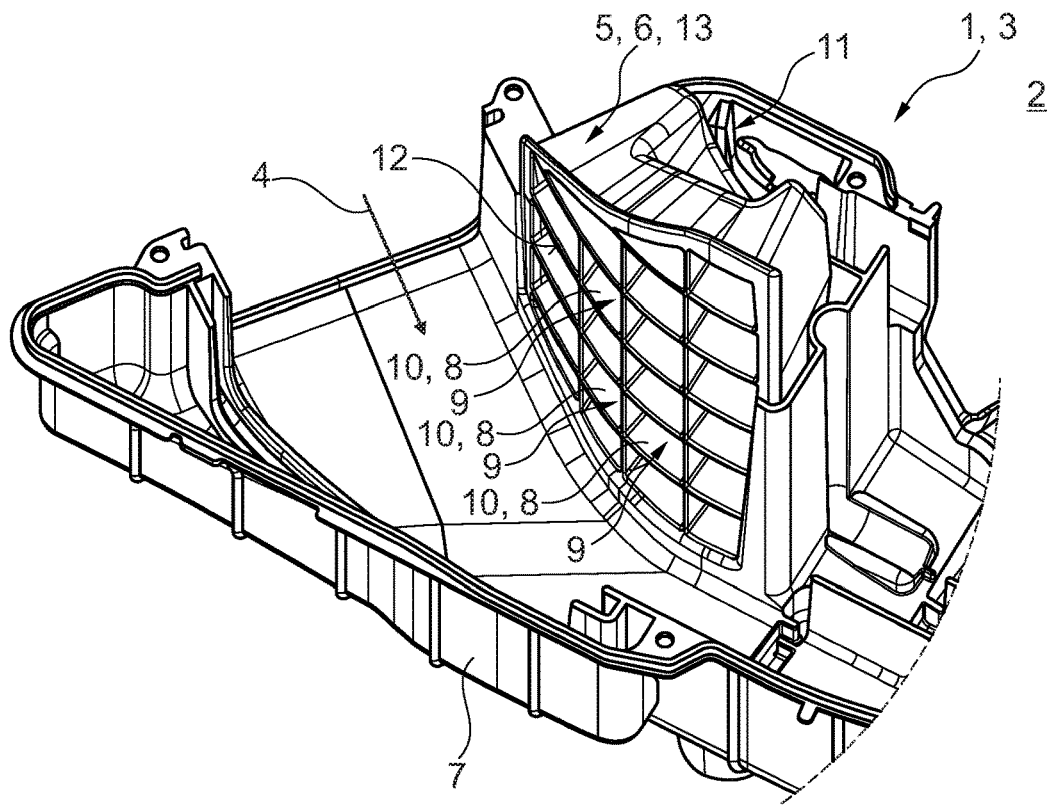
FIGS. 1 and 2 show partial views of a ventilating tube according to the invention comprising a wavelength resonator in an air conditioning system.
Figure 2:
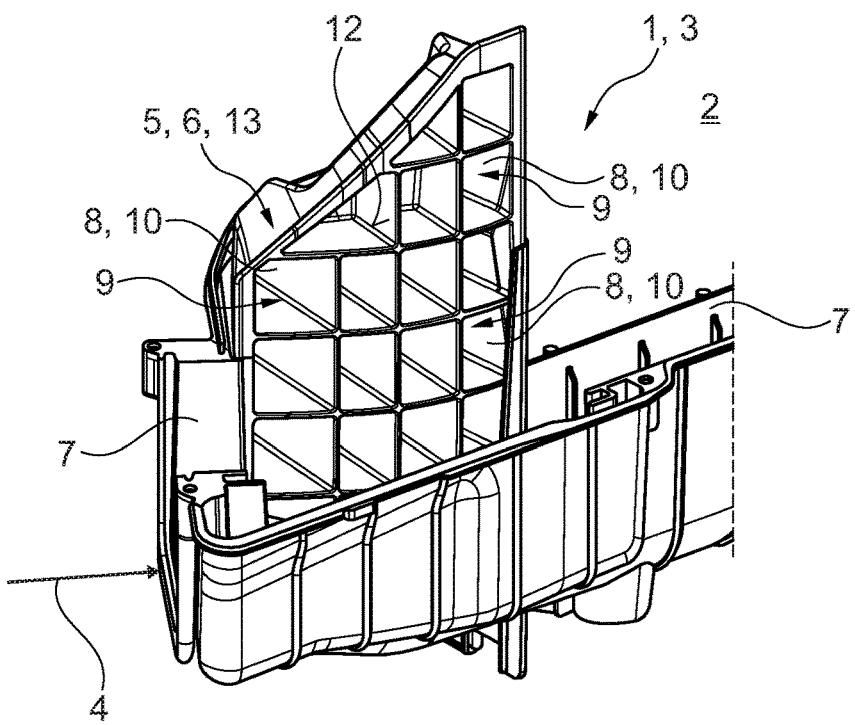

FIG. 1 and FIG. 2 show partial views of a ventilating tube 1 according to the invention in an air conditioning system 2, which is a diffusor 3 here. Air can flow through the ventilating tube 1 in the air flow direction 4—only a partial piece of the ventilating tube 1 is shown here for the sake of clarity—and it has a sound attenuating device 13. The sound attenuating device 13 is thereby a wavelength resonator 5, which is embodied as a separate insert 6 and which is secured to a wall 7 of the ventilating tube 1. A receiving opening 11 is embodied in the wall 7 for this purpose. The wavelength resonator 5 has a plurality of resonance chambers 8, which are arranged next to one another in a plurality of rows and columns. The respective resonance chamber 8 in each case has an opening 9, which opens the respective resonance chamber 8 transversely to the air flow direction 4 into the ventilating tube 1. The resonance chambers 8 are closely cube-shaped here and the respective openings 9 are formed by an open side surface in the resonance chambers 8. The respective resonance chambers 8 of the wavelength resonator 5 are embodied as λ/4 resonators 10 here.

The resonance chambers 8 of the wavelength resonator 5 have shapes, volumes, depths, and cross sections, which differ from one another, of the openings 9, so that the attenuating effect of the wavelength resonator 5 can be attained in a broader wavelength range. The openings 9 of the resonance chambers 8 further form a joint opening surface 12, which is aligned in the air flow direction 4 and which is laterally adjacent to the wall 7 of the ventilating tube 1 in a flush manner. An unwanted noise development can thus be avoided in the ventilating tube 1.

FIG. 3 shows a top view onto the wavelength resonator 6. FIG. 4 and FIG. 5 show sectional views of the wavelength resonator 6 in different planes.

In summary, the resonance chambers 8, which are embodied here as the λ/4 resonators 10, have significantly small openings 9 as compared with a conventional expansion chamber comprising a cover, so that no significant flow interference or noise generation takes place in the wavelength resonator 5. As compared with a conventional expansion chamber comprising a cover, the latter can analogously be forgone. Material and assembly costs can thus be reduced with an at least consistent or improved attenuating effect.

The invention claimed is:

1. A ventilating tube, comprising:
a body including a base portion and a plurality of wall portions projecting from the base portion in a first direction, the base portion and a wall portion of the plurality of wall portions at least partially defining a curved air flow passage through which air is flowable in an air flow path, such that the air flow changes direction within the air flow passage;
a sound attenuating mechanism for attenuating airborne noise;
wherein the sound attenuating mechanism is a wavelength resonator including a plurality of resonance chambers;
wherein, on one side, the resonance chambers each have an opening which opens the respective resonance chamber into the air flow passage transversely to the air flow path, the openings together define a joint opening area having a curved region, a curve of the curved region matching the curve of the air flow passage;
wherein the base portion and the plurality of wall portions of the body includes a wall at least partially define a receiving opening into which the wavelength resonator is insertable in a second direction that is opposite the first direction; and
wherein the wavelength resonator is structured as a separate insert and is arranged in the receiving opening.

2. The ventilating tube according to claim 1, wherein the wavelength resonator is a λ/4 resonator.

3. The ventilating tube according to claim 1, wherein at least one resonance chamber of the wavelength resonator is a λ/4 resonator.

4. The ventilating tube according to claim 1, wherein at least one resonance chamber is cube-shaped and the respective opening is structured as an open side surface of the cube-shaped resonance chamber.

5. The ventilating tube according to claim 1, wherein a cross section of at least one resonance chamber in an air flow direction corresponds to a cross section of the respective opening at least in a chamber section disposed adjacent to the respective opening.

6. The ventilating tube according to claim 1, wherein the opening of each of the plurality of resonance chambers opens the plurality of resonance chambers into the body transversely to an air flow direction.

7. The ventilating tube according to claim 6, wherein the joint opening area is aligned in the air flow direction.

8. The ventilating tube according to claim 7, wherein:
the portion wall is disposed laterally adjacent to the wavelength resonator; and
the portion wall and the joint opening area of the wavelength resonator transition into one another in a flush manner.

9. The ventilating tube according to claim 6, wherein the plurality of resonance chambers of the wavelength resonator have at least one of shapes, volumes, depths, and opening cross sections which differ from one another.

10. The ventilating tube according to claim 1, wherein:
the wavelength resonator includes a plurality of separating walls structured and arranged to define a grid; and
each separating wall of the plurality of separating walls:
extends between and separates at least two adjacent resonance chambers of the plurality of resonance chambers from one another; and
at least partially delimits each of the associated at least two adjacent resonance chambers.

11. The ventilating tube according to claim 10, wherein:
the wavelength resonator further includes a curved surface that delimits a closed end of a resonance chamber of the plurality of resonance chambers; and
the closed end of the resonance chamber is disposed opposite the opening of the resonance chamber.

12. The ventilating tube according to claim 1, wherein:
the plurality of resonance chambers includes a first resonance chamber and a second resonance chamber;
the opening of the first resonance chamber is triangular; and
the opening of the second resonance chamber is trapezoidal.

13. The ventilating tube according to claim 1, wherein:
the body further includes an outer wall projecting from the base portion; and
the wall portion and the outer wall are disposed spaced apart from one another and at least partially define the air flow passage therebetween.

14. The ventilating tube according to claim 1, wherein:
the plurality of wall portions includes a second wall portion and a third wall portion;
the wall portion is disposed adjacent to the openings of the resonance chambers;
the third wall portion is disposed adjacent to a closed end of resonance chambers opposite the openings; and
the second wall portion extends between and connects the wall portion and the third wall portion.

15. A ventilating tube, comprising:
a body through which air is flowable in an air flow direction;
a sound attenuating mechanism for attenuating airborne noise;
wherein the sound attenuating mechanism is a wavelength resonator including a plurality of resonance chambers and a plurality of openings;
wherein each of the plurality of openings is disposed on a side of an associated resonance chamber of the plurality of resonance chambers and opens the associated resonance chamber into the body transversely to the air flow direction;
wherein the plurality of resonance chambers are arranged next to one another in a plurality of rows and a plurality of columns;
wherein the plurality of openings are aligned with one another and collectively define a joint opening area facing transversely to the air flow direction;
wherein the joint opening area transitions in the air flow direction into an adjacent wall portion of the body in a flush manner;
wherein the plurality of resonance chambers includes a first resonance chamber, a second resonance chamber, and a third resonance chamber;
wherein the first resonance chamber and the second resonance chamber are disposed adjacent to one another in a first row of the plurality of rows;
wherein the third resonance chamber is disposed in a second row of the plurality of rows and boarders the first resonance chamber and the second resonance chamber;
wherein the opening of the third resonance chamber is trapezoidal;
wherein the first row and the second row have a different number of resonance chambers; and
wherein the wavelength resonator is structured as a separate insert and is arranged in a receiving opening of the body.

16. The ventilating tube according to claim 15, wherein:
the plurality of resonance chambers further includes a fourth resonance chamber disposed in the second row adjacent to the third resonance chamber;
the opening of the fourth resonance chamber is smaller than the opening of the third resonance chamber; and
the opening of each of the first resonance chamber, the second resonance chamber, and the fourth resonance chamber is rectangular.

17. The ventilating tube according to claim 15, wherein:
the body includes a base portion and a plurality of wall portions projecting from the base portion in a first direction;
the plurality of wall portions includes the wall portion;
the base portion and the wall portion define an air flow passage through which air is flowable in the air flow direction; and
the base portion and the plurality of wall portions of the body at least partially define the receiving opening into which the wavelength resonator is insertable in a second direction that is opposite the first direction.

* * * * *

UNITED STATES PATENT AND TRADEMARK OFFICE
CERTIFICATE OF CORRECTION

PATENT NO. : 11,738,621 B2
APPLICATION NO. : 16/579041
DATED : August 29, 2023
INVENTOR(S) : Ralf Berndt It is certified that error appears in the above-identified patent and that said Letters Patent is hereby corrected as shown below:

In the Claims

At Column 4, Claim number 8, Line number 44, delete "portion wall" and replace with wall portion;

At Column 4, Claim number 8, Line number 46 delete "portion wall" and replace with wall portion.

Signed and Sealed this
Twelfth Day of December, 2023

Katherine Kelly Vidal
*Director of the United States Patent and Trademark Office*